(12) United States Patent
Chen et al.

(10) Patent No.: US 10,892,863 B2
(45) Date of Patent: Jan. 12, 2021

(54) JOINT NULLING AND JOINT BEAMFORMING FOR DOWNLINK TRANSMISSIONS BY MULTIPLE ACCESS POINTS (AP)

(71) Applicant: Intel Corporation, Santa Clara, CA (US)

(72) Inventors: Xiaogang Chen, Hillsboro, OR (US);
Qinghua Li, San Ramon, CA (US);
Feng Jiang, Santa Clara, CA (US);
Po-Kai Huang, San Jose, CA (US);
Laurent Cariou, Portland, OR (US);
Robert J. Stacey, Portland, OR (US);
Thomas J. Kenney, Portland, OR (US);
Ziv Avital, Raanana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/566,478

(22) Filed: Sep. 10, 2019

(65) Prior Publication Data
US 2020/0007283 A1 Jan. 2, 2020

Related U.S. Application Data

(60) Provisional application No. 62/750,161, filed on Oct. 24, 2018, provisional application No. 62/729,377, (Continued)

(51) Int. Cl.
*H04L 5/00* (2006.01)
*H04B 17/327* (2015.01)
(Continued)

(52) U.S. Cl.
CPC .......... *H04L 5/0035* (2013.01); *H04B 7/024* (2013.01); *H04B 7/0617* (2013.01);
(Continued)

(58) Field of Classification Search
CPC ..................... H04B 7/0697; H04B 7/0621; H04B 7/01617; H04B 7/0617; H04B 7/0626;
(Continued)

(56) References Cited

U.S. PATENT DOCUMENTS

| | | | |
|---|---|---|---|
| 2016/0234657 A1* | 8/2016 | Liu | H04W 4/06 |
| 2018/0331749 A1* | 11/2018 | Ghosh | H04L 5/0048 |
| 2019/0045366 A1* | 2/2019 | Vermani | H04B 7/0452 |

* cited by examiner

*Primary Examiner* — Janice N Tieu
(74) *Attorney, Agent, or Firm* — Schwegman Lundberg & Woessner, P.A.

(57) ABSTRACT

Embodiments of an access point (AP), station (STA) and method of communication are generally described herein. An AP may be configurable to operate as a master AP of a multi-AP group comprising the master AP and one or more satellite APs. The master AP may select, from the multi-AP group, a set of APs that is to communicate with a STA in accordance with joint processing. The master AP may allocate one or more spatial streams to each of the APs of the set of APs for a joint transmission of a null data packet (NDP) to the STA for channel sounding. The master AP may transmit an NDP announcement (NDPA) that indicates that the APs of the set of APs are to perform the joint transmission of the NDP.

4 Claims, 9 Drawing Sheets

Related U.S. Application Data filed on Sep. 10, 2018, provisional application No. 62/729,269, filed on Sep. 10, 2018.

(51) Int. Cl.
| | |
|---|---|
| *H04B 7/06* | (2006.01) |
| *H04W 92/12* | (2009.01) |
| *H04B 7/024* | (2017.01) |
| *H04W 74/08* | (2009.01) |

(52) U.S. Cl.
CPC ........ *H04B 17/327* (2015.01); *H04W 74/085* (2013.01); *H04W 92/12* (2013.01)

(58) Field of Classification Search
CPC ....... H04B 7/0452; H04B 7/0417; H04L 1/16; H04L 5/0048; H04L 5/0023; H04W 16/10; H04W 72/0446
See application file for complete search history.

JOINT NULLING AND JOINT BEAMFORMING FOR DOWNLINK TRANSMISSIONS BY MULTIPLE ACCESS POINTS (AP)

PRIORITY CLAIM

This application claims priority under 35 USC 119(e) to U.S. Provisional Patent Application Ser. No. 62/729,377, filed Sep. 10, 2018 [reference number AB3667-Z, 1884.913PRV], and to U.S. Provisional Patent Application Ser. No. 62/729,269, filed Sep. 10, 2018 [reference number AB4956-Z, 1884.914PRV], and to U.S. Provisional Patent Application Ser. No. 62/750,161, filed Oct. 24, 2018 [reference number AB6322-Z, 1884.915PRV], all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for joint nulling and joint beamforming for downlink transmissions by multiple access points (AP).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
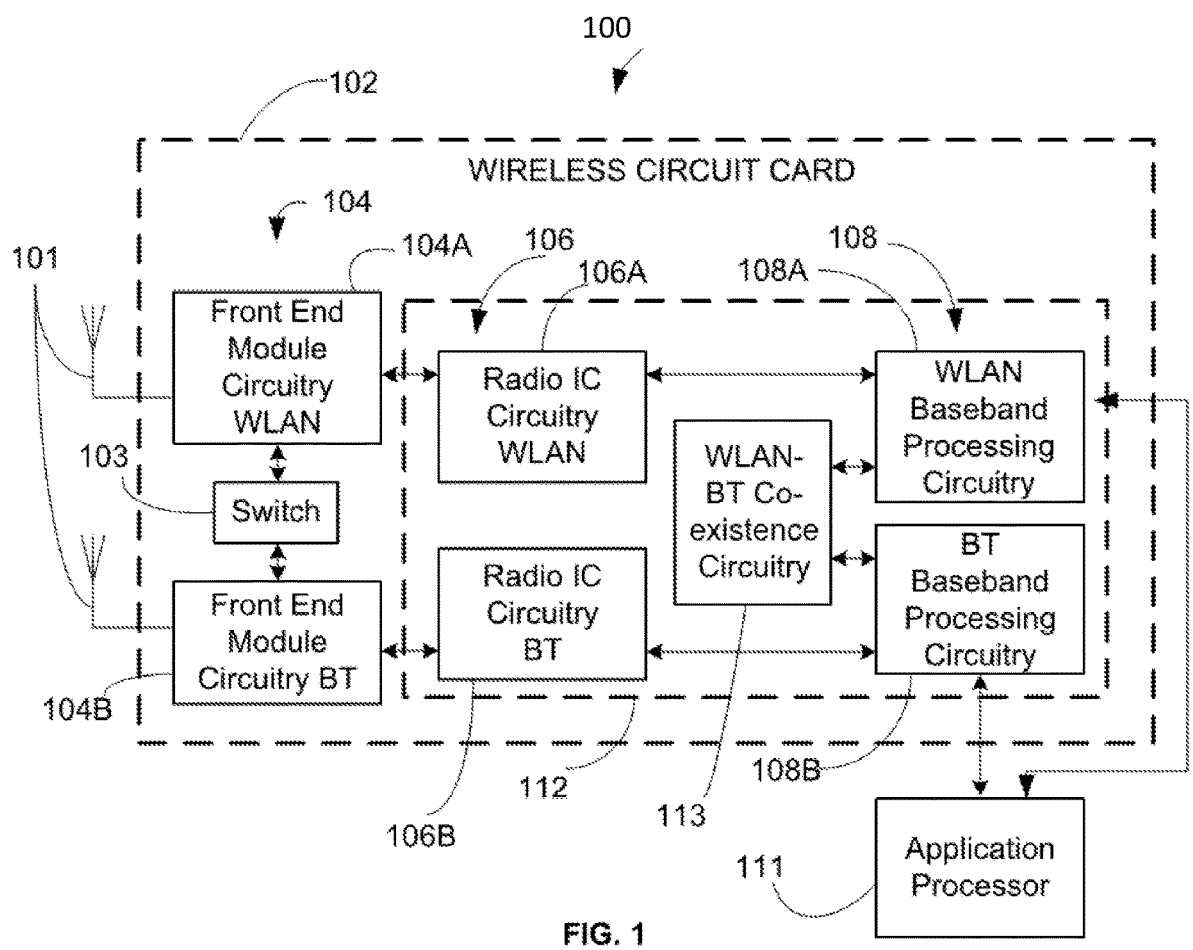
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
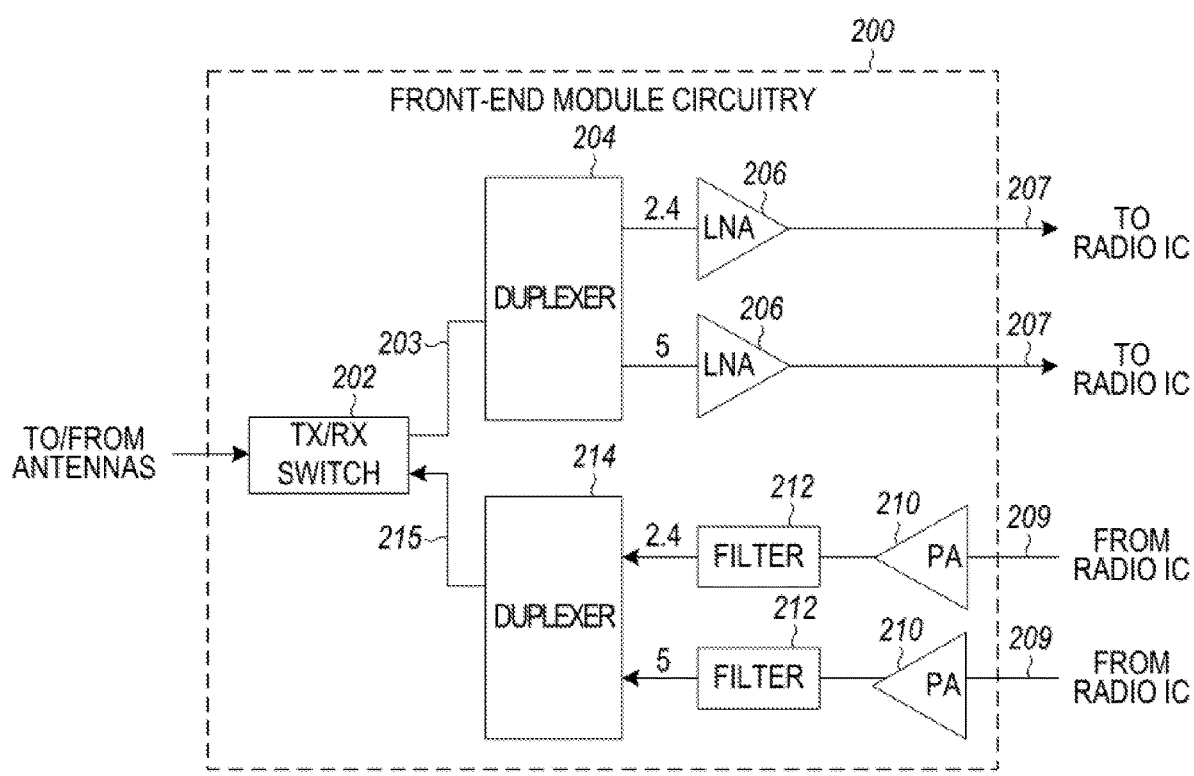
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
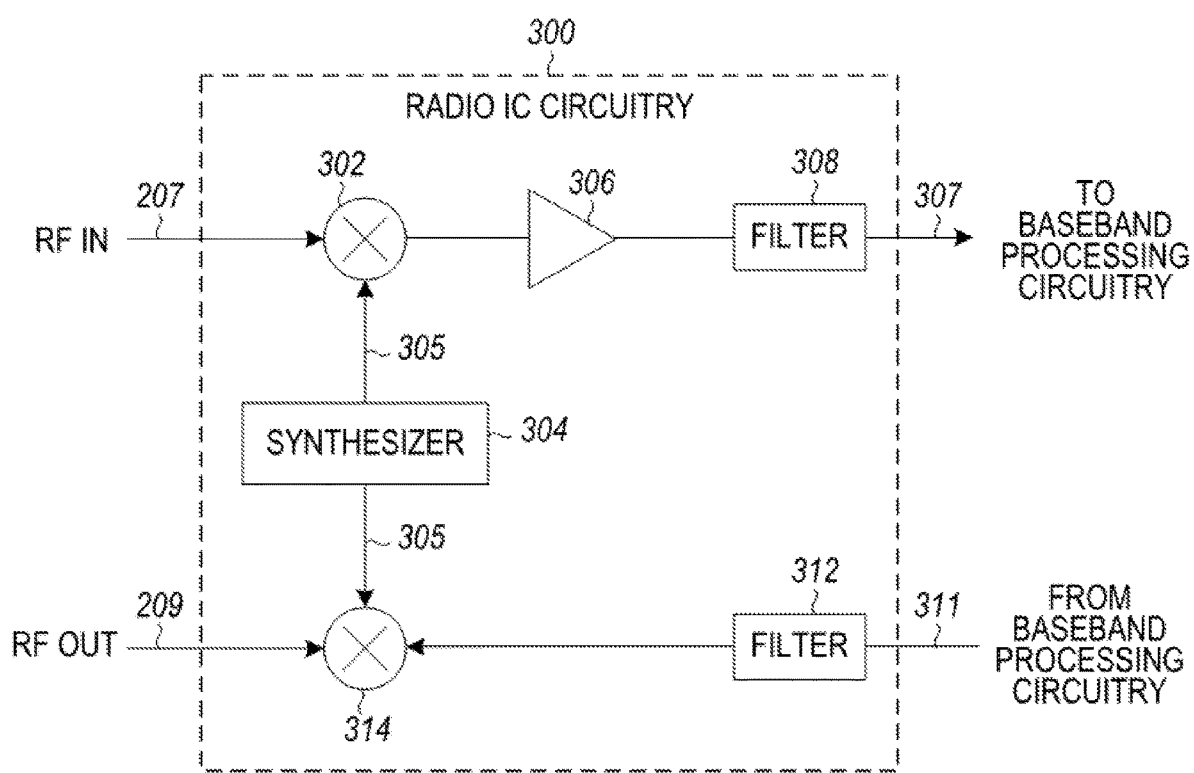
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
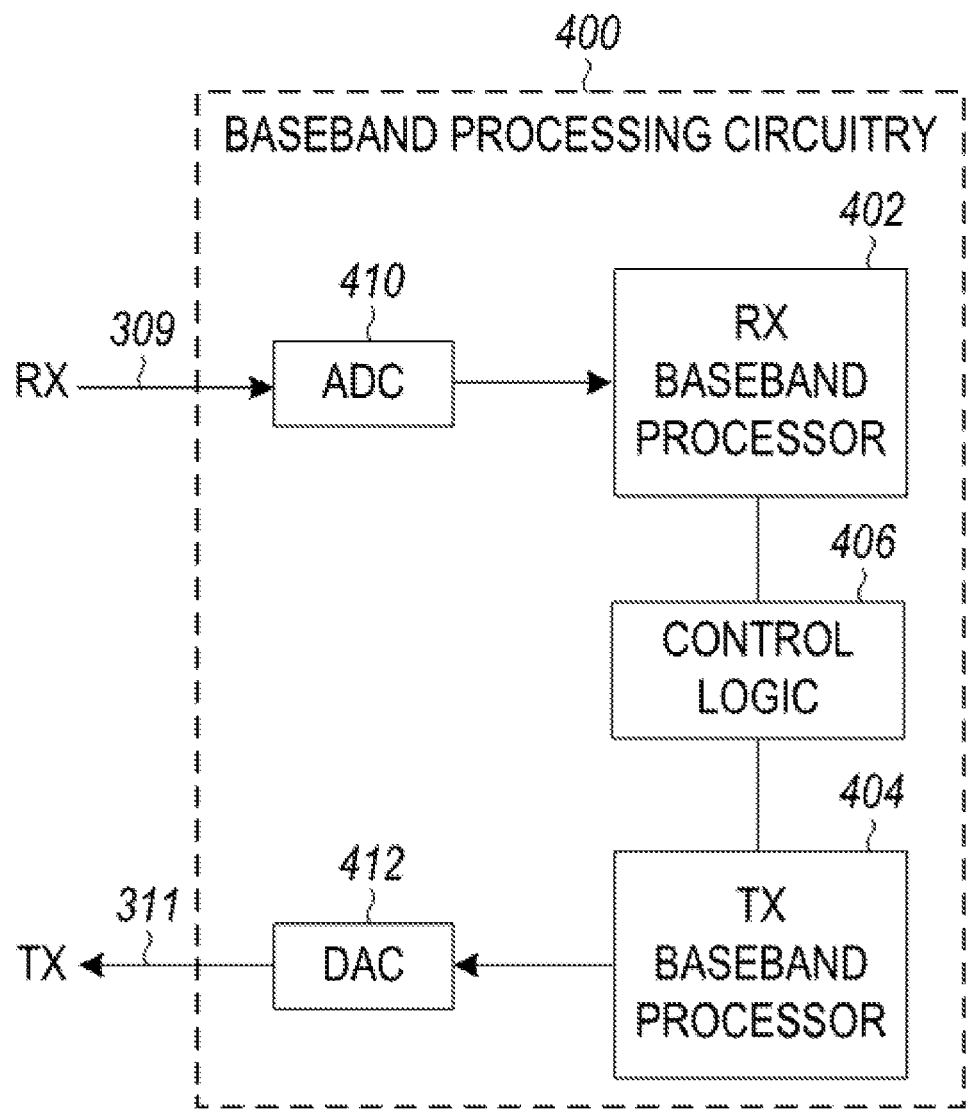
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
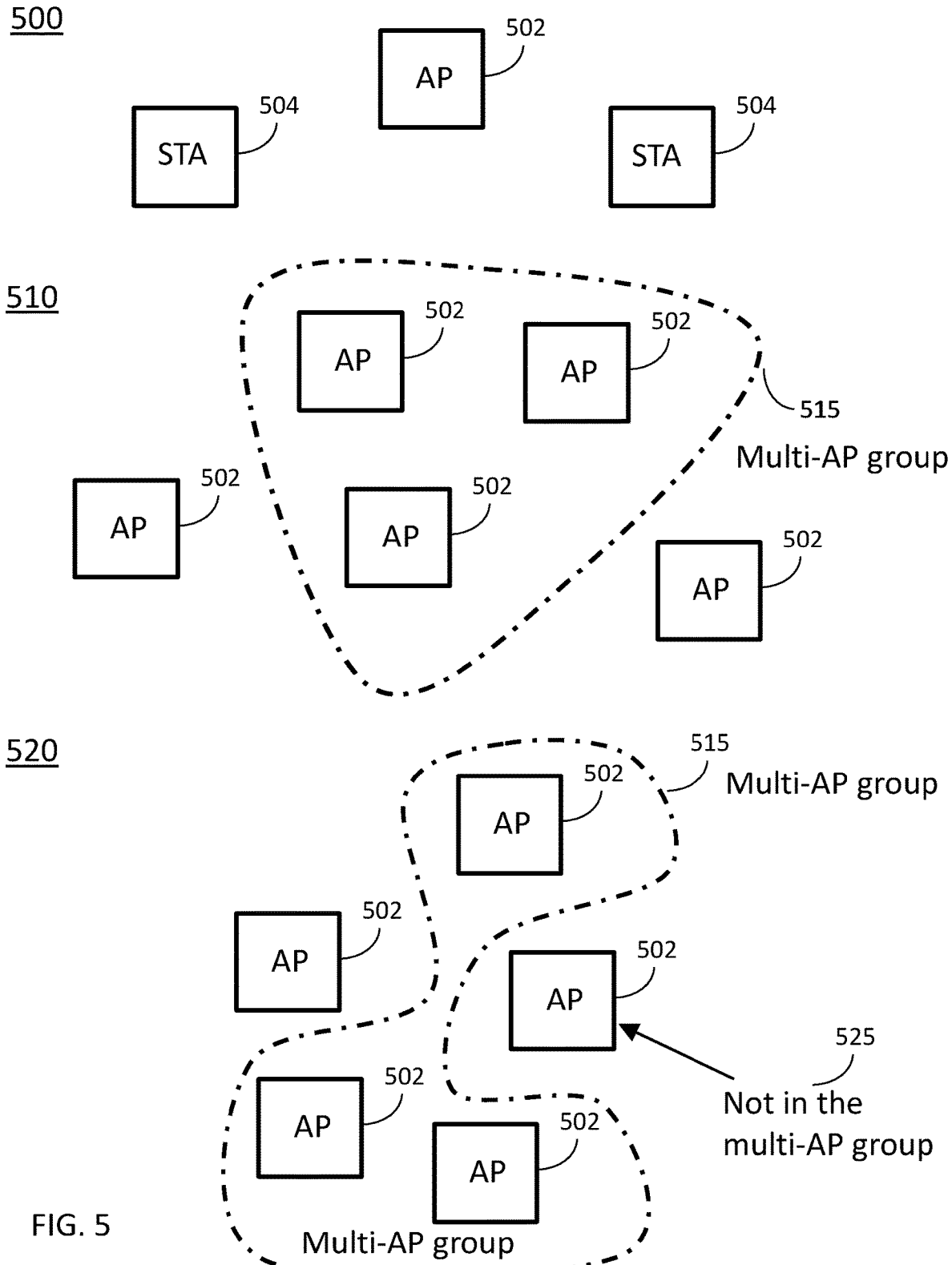
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. In some embodiments, the AP 502 may communicate with one or more of the STAs 504. Embodiments are not limited to a single AP 502, as the WLAN 500 may comprise one or more APs 502, in some embodiments.

In some embodiments, multiple APs 502 may be grouped into a multi-AP group 515, which will be described in more detail herein. Example multi-AP groups 515 are shown in the non-limiting examples 510 and 520 in FIG. 5. In some embodiments, one or more factors may determine which APs 502 are in the multi-AP group 515, examples of which are described herein. Such factors may include one or more of: geography, capability, whether or not an AP 502 has requested to join the multi-AP group 515, whether or not the AP 502 has been asked to join the multi-AP group 515, and/or other factor(s). It should be noted that the multi-AP group 515 may not necessarily include APs 502 that are closest to each other geographically, although such arrangements are possible.

In a non-limiting example, 510 illustrates a scenario in which the multi-AP group 515 includes three APs 502. The three APs 502 in the multi-AP group 515 in the scenario 510 may be closest to each other geographically in this case. The geography of the three APs 502 that are included in the multi-AP group 515 may be a factor in whether or not those three APs 502 are included in the multi-AP group 515, although the scope of embodiments is not limited in this respect.

In another non-limiting example, 520 illustrates a scenario in which the multi-AP group 515 includes three APs 502. Those three APs 502 are not the closest to each other geographically, as the AP 502 indicated by 525 is not included in the multi-AP group 515.

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax, EHT-related, and/or other. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502.

The AP 502 and/or the STAs 504 may operate in accordance with one or more of IEEE 802.11 a/b/g/n/ac/ad/af/ah/aj/ay, EHT, or another wireless communication standard. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol and/or EHT protocol.

The AP 502 may communicate with the STAs 504 in accordance with IEEE 802.11 communication techniques.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the P 502, STA 504, and/or other device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
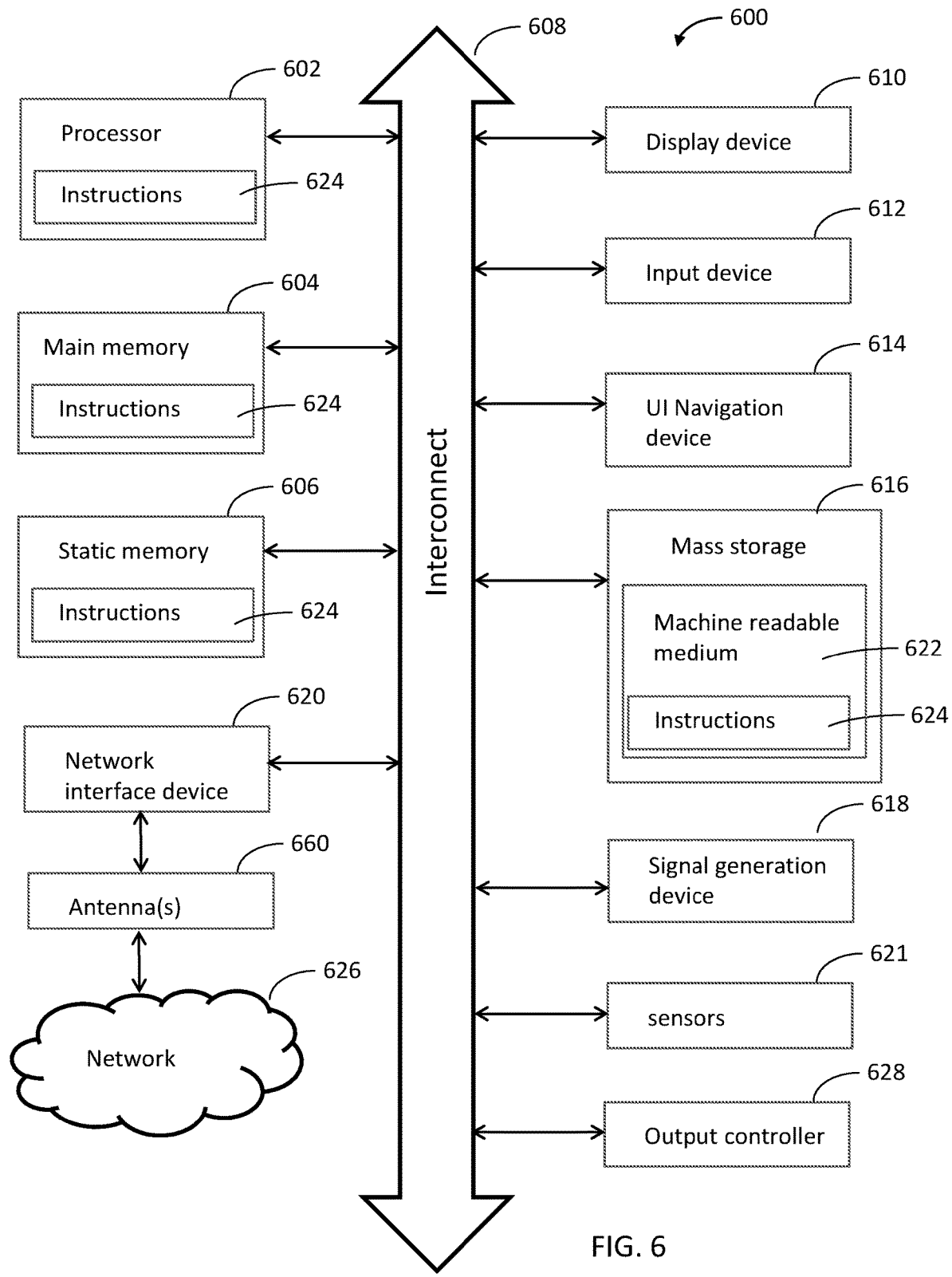
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware)

capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
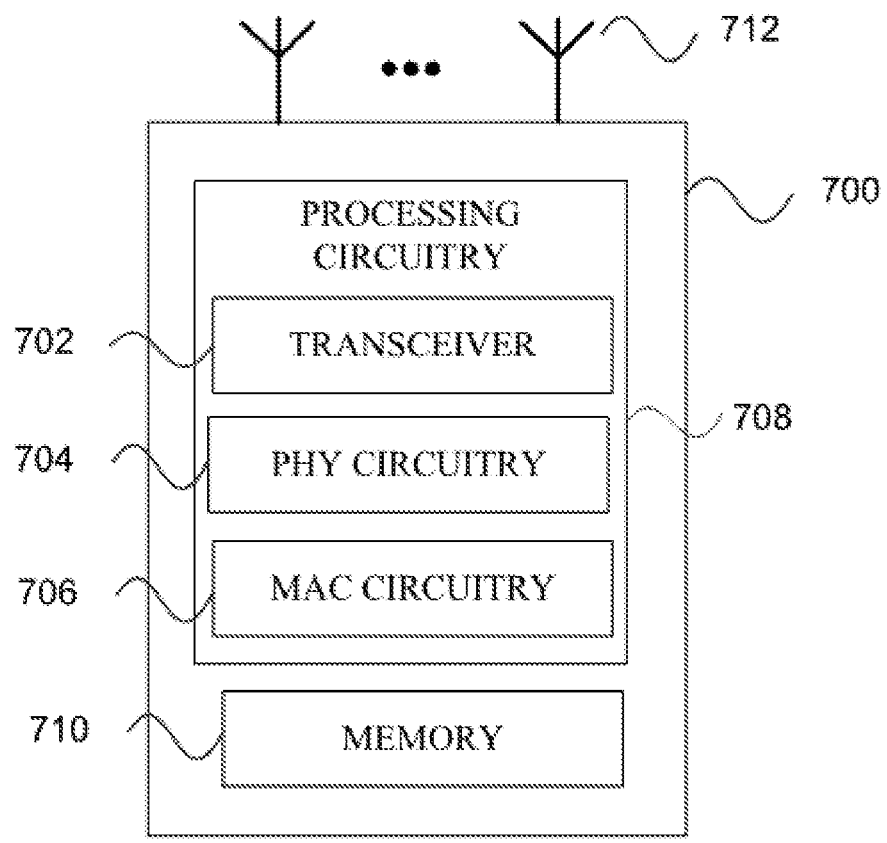
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, an AP 502 may be configurable to operate as a master AP 502 of a multi-AP group 515. The multi-AP group 515 may comprise the master AP 502 and one or more satellite APs 502. The master AP 502 may select, from the multi-AP group 515, a set of APs 502 that is to communicate with a STA 504 in accordance with joint processing. The set of APs 502 may include the master AP 502 and one or more of the satellite APs 502 of the multi-AP group 515. The master AP 502 may allocate one or more spatial streams to each of the APs 502 of the set of APs 502 for a joint transmission of a null data packet (NDP) to the STA 504 for channel sounding. The master AP 502 may transmit an NDP announcement (NDPA) that indicates that the APs 502 of the set of APs 502 are to perform the joint transmission of the NDP. The master AP 502 may transmit the NDP in the one or more spatial streams allocated to the master AP 502. The master AP 502 may receive beam-forming feedback related to reception of the NDP at the STA 504. These embodiments are described in more detail below.

Figure 8:
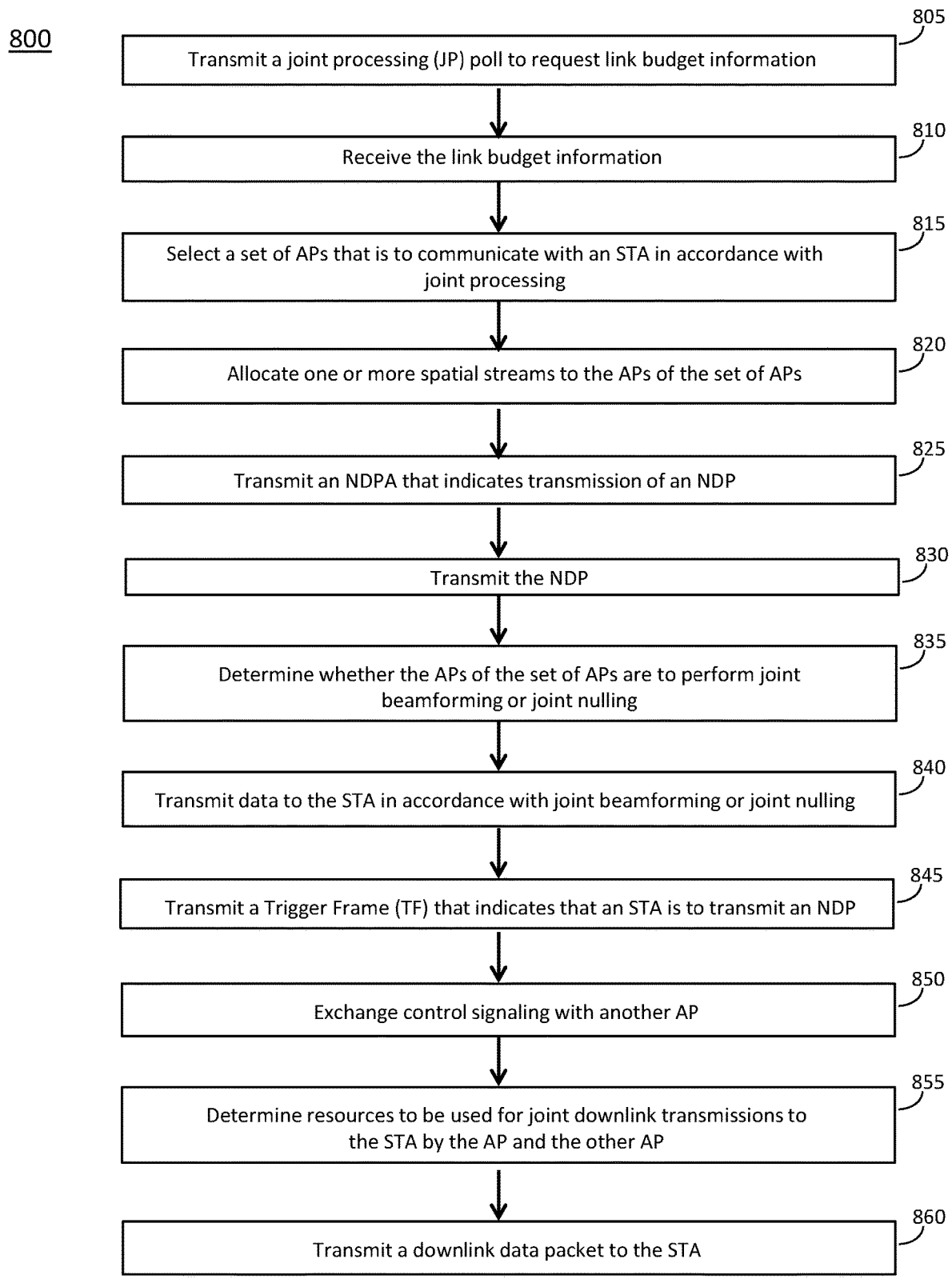
FIG. 8 illustrates the operation of a method in accordance with some embodiments.
Figure 9:
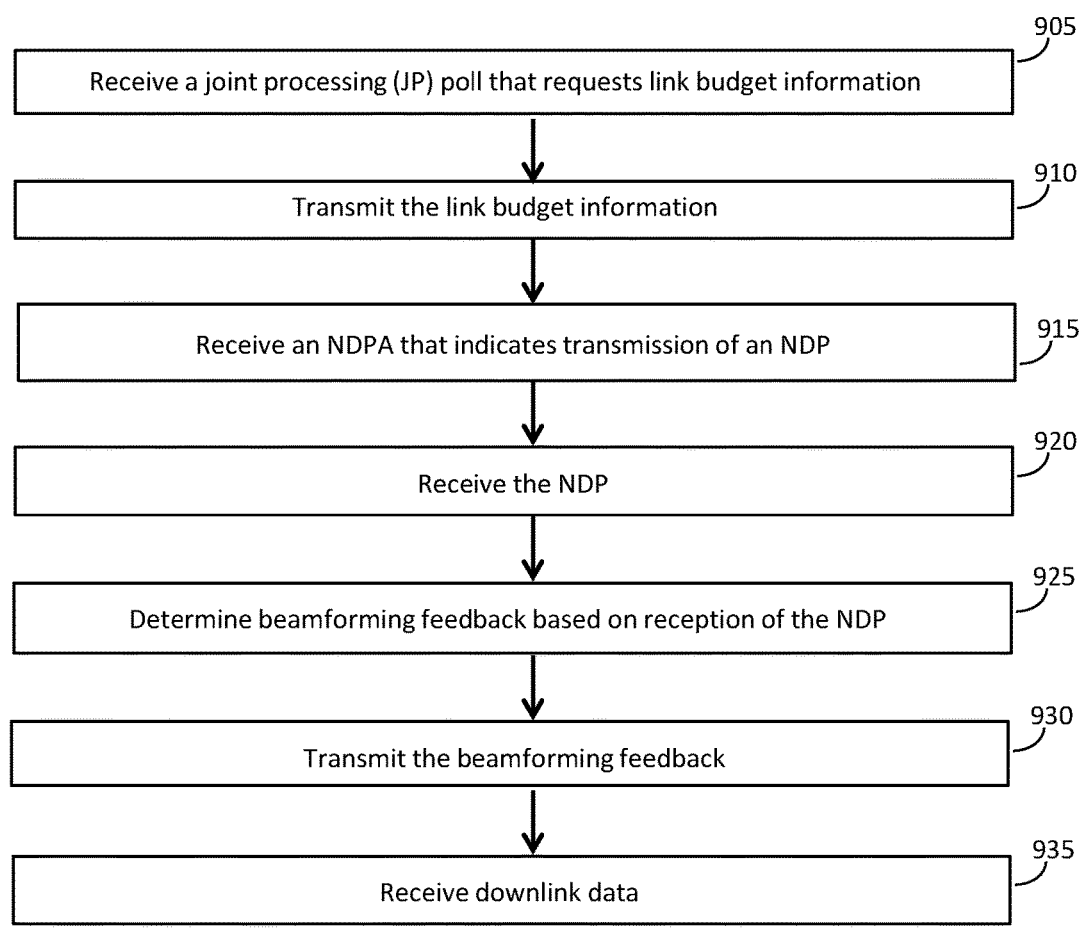
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In descriptions of the methods 800, 900, reference may be made to one or more figures, although it is understood that the methods 800, 900 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations that may be the same as, similar to and/or reciprocal to one or more operations of the method 800. In a non-limiting example, the STA 504 may perform an operation that may be the same as, similar to, reciprocal to and/or related to an operation of the method 800, in some embodiments.

In some embodiments, an STA 504 may perform one or more operations of the method 900, but embodiments are not limited to performance of the method 900 and/or operations of it by the STA 504. In some embodiments, another device and/or component may perform one or more operations that may be the same as, similar to and/or reciprocal to one or more operations of the method 900. In a non-limiting example, the AP 502 may perform an operation that may be the same as, similar to, reciprocal to and/or related to an operation of the method 900, in some embodiments.

It should be noted that one or more operations of one method (such as 800, 900 and/or other method described herein) may be the same as, similar to and/or reciprocal to one or more operations of another method (such as 800, 900 and/or other method described herein). For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the AP 502, and an operation of another method may include reception of a same element (and/or similar element) by the STA 504. In some cases, descriptions of operations and techniques described as part of one method (such as 800, 900 and/or other method described herein) may be relevant to another method (such as 800, 900 and/or other method described herein). Discussion of various techniques and concepts described as part of one method (such as 800, 900 and/or other method described herein) may be relevant to another method (such as 800, 900 and/or other method described herein), although the scope of embodiments is not limited in this respect.

The methods 800, 900 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 and/or other method described herein may also be applicable to an apparatus of an AP 502, an apparatus of a STA 504 and/or an apparatus of another device. In some embodiments, an apparatus of an AP 502 may perform one or more operations of the method 800 and/or other operations. In some embodiments, an apparatus of a STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the AP 502 may transmit a joint processing (JP) poll to request link budget information. At operation 810 the AP 502 may receive the link budget information. At operation 815, the AP 502 may select a set of APs 502 that is to communicate with an STA 504 in accordance with joint processing. At operation 820, the AP 502 may allocate one or more spatial streams to the APs of the set of APs 502. At operation 825, the AP 502 may transmit a null data packet (NDP) announcement (NDPA) that indicates transmission of an NDP. At operation 830, the AP 502 may transmit the NDP. At operation 835, the AP 502 may determine whether the APs 502 of the set of APs 502 are to perform joint beamforming or joint nulling. At operation 840, the AP 502 may transmit data to the STA 504 in accordance with joint beamforming or joint nulling.

In some embodiments, the AP 502 may be configurable to operate as a master AP 502 of a multi-AP group 515. In some embodiments, the multi-AP group 515 may comprise the master AP 502 and one or more satellite APs 502. It should be noted that the AP 502 may perform one or more operations (including but not limited to operations of the method 800) when the AP 502 is configured to operate as a master AP 502, although the scope of embodiments is not limited in this respect. For simplicity, descriptions herein may refer to performance of operations by a master AP 502, but it is understood that an AP 502 and/or an AP 502 configured to operate as a master AP 502 may perform one or more of those operations.

In some embodiments, the master AP 502 may select, from the multi-AP group 515, a set of APs 502 that is to communicate with an STA 504 in accordance with joint processing. The set of APs 502 may include the master AP 502 and one or more of the satellite APs 502 of the multi-AP group 515. In some embodiments, the master AP 502 may allocate one or more spatial streams to each of the APs 502 of the set of APs 502 for a joint transmission of a null data packet (NDP) to the STA 504 for channel sounding and/or other purpose(s). In some embodiments, the master AP 502 may transmit an NDP announcement (NDPA) that indicates that the APs 502 of the set of APs 502 are to perform the joint transmission of the NDP.

In some embodiments, the master AP 502 may transmit the NDP in the one or more spatial streams allocated to the master AP 502. In some embodiments, the master AP 502 may receive beam-forming feedback related to reception of the NDP at the STA 504. In some embodiments, the master AP 502 may determine, based on the beam-forming feedback, whether the APs 502 of the set of APs 502 are to perform joint beam-forming for a data transmission to the STA 504 or joint nulling toward the STA 504.

In some embodiments, the joint beam-forming may include simultaneous transmission of data to the STA 504, by the APs 502 of the set of APs 502, on different spatial streams, although the scope of embodiments is not limited in this respect. For instance, different frequency resources may be used by different APs 502 of the set of APs 502 in some embodiments.

In some embodiments, the joint nulling may include, for each of the APs 502 of the set of APs 502, one or more of: determination of beam-forming coefficients for which a corresponding transmission by the AP 502 results in a null in terms of directional transmission energy toward the STA 504; transmission in accordance with the determined beam-forming coefficients; and/or other.

In some embodiments, the master AP 502 may receive at least a portion of the beam-forming feedback from the STA 504. In some embodiments, the master AP 502 may receive at least a portion of the beam-forming feedback from one of the satellite APs 502 operating as a relay for the STA 504. In some embodiments, the master AP 502 may receive a first portion of the beam-forming feedback from the STA 504, and may receive a second portion of the beam-forming feedback from one of the satellite APs 502 operating as a relay for the STA 504.

In some embodiments, the master AP 502 may perform one or more of the following operations: transmit a joint processing (JP) poll to request link budget information between the STA 504 and one or more of the APs 502 of the multi-AP group 515; receive the link budget information; select the set of APs 502 based at least partly on the link budget information; and/or other. One or more of those operations described immediately above may be performed before selection of the set of APs 502, although the scope of embodiments is not limited in this respect.

In some embodiments, the master AP 502 may receive at least a portion of the link budget information from the STA 504. In some embodiments, the master AP 502 may receive at least a portion of the link budget information from one or more of the satellite APs 502 operating as relays for the STA 504. In some embodiments, the master AP 502 may receive at least a first portion of the link budget information from the STA 504, and may receive at least a second portion of the link budget information from one or more of the satellite APs 502 operating as relays for the STA 504.

In some embodiments, the master AP 502 may encode the NDPA to indicate a mapping between the APs 502 of the set of APs 502 and the allocated spatial streams. In some embodiments, the master AP 502 may encode, for broadcast transmission, a beacon frame that indicates the mapping between the APs 502 of the set of APs 502 and the allocated spatial streams.

In some embodiments, the master AP 502 may encode the NDPA to indicate a feedback type of the beam-forming feedback. In some embodiments, the feedback type may be included in a set of candidate feedback types that includes one or more of: single user (SU) beam-forming feedback, multi-user (MU) beam-forming feedback, SU nulling feedback, MU nulling feedback and/or other.

In some embodiments, the master AP 502 may encode the NDPA to indicate an advanced identifier (ID) of the STA 504. In some embodiments, the advanced ID may be based on one or more STA information fields and/or one or more AP information fields.

In some embodiments, the master AP 502 may transmit a beam-forming report trigger (BFRP) to request the sounding feedback from the STA 504.

In some embodiments, the master AP 502 may encode the NDPA to include one or more STA information fields to indicate the APs 502 of the set of APs 502 that are to transmit the NDP.

At operation 845, the AP 502 may transmit a Trigger Frame (TF) that indicates that an STA 504 is to transmit an NDP. At operation 850, the AP 502 may exchange control signaling with another AP 502. At operation 855, the AP 502 may determine resources to be used for joint downlink transmissions to the STA 504 by the AP 502 and the other AP 502. At operation 860, the AP 502 may transmit one or more downlink data packets to the STA 504.

In some embodiments, the AP 502 may transmit a Trigger Frame (TF) that indicates that an STA 504 is to transmit an uplink NDP. In some embodiments, the AP 502 may determine a first channel estimate based on the uplink NDP. In some embodiments, the first channel estimate may be for a first channel between the AP 502 and the STA 504. In some embodiments, the AP 502 may receive, from another AP 502, first control signaling that indicates a second channel estimate based on the uplink NDP. The second channel estimate may be for a second channel between the other AP 502 and the STA 504.

In some embodiments, the AP 502 may determine, based on the first and second channel estimates, first and second resources for joint downlink transmissions by the AP 502 and the other AP 502. In some embodiments, the first resources may be used for a first downlink transmission by the AP 502 to the STA 504. In some embodiments, the second resources may be used for a second downlink transmission by the other AP 502 to the STA 504.

In some embodiments, the AP 502 may transmit, to the other AP 502, second control signaling that indicates the second resources. In some embodiments, the AP 502 may encode a downlink data packet for the first downlink transmission to the STA 504.

In some embodiments, the AP 502 may transmit the TF in a transmit opportunity (TXOP) obtained by the AP 502. In some embodiments, the first and second downlink transmissions may be performed within the TXOP. In some embodiments, the first channel estimate is a downlink channel estimate. In some embodiments, the AP 502 may determine an uplink channel estimate based on the uplink NDP. In some embodiments, the AP 502 may determine the downlink channel estimate based at least partly on a reciprocity of uplink and downlink of the first channel between the AP 502 and the STA 504.

In some embodiments, the first resources may include first frequency resources for the first downlink transmission, the second resources may include second frequency resources for the second downlink transmission, and the first frequency resources may at least partly overlap the second frequency resources.

In some embodiments, the first resources may include first spatial resources for the first downlink transmission, and the second resources may include second spatial resources for the second downlink transmission.

In some embodiments, the uplink NDP may include one or more of: one or more legacy training fields, an extremely high throughput (EHT) signal (EHT-SIG) field, an EHT short training field (EHT-STF), an EHT long training field (EHT-LTF), and/or other. In some embodiments, the AP 502 may determine the first channel estimate based on the EHT-LTF field, although the scope of embodiments is not limited in this respect.

In some embodiments, the AP 502 may be configurable to operate as a master AP 502 of a multi-AP group 515 that includes the other AP 502 as a slave AP 502. In some embodiments, the AP 502 may be configurable to operate as a slave AP 502 of the multi-AP group 515 for which the other AP 502 is a master AP 502.

In some embodiments, the AP 502 may receive the uplink NDP in a plurality of tones. In some embodiments, the AP 502 may determine, based on the uplink NDP, a plurality of channel quality indicators (CQIs) for at least some of the tones. In some embodiments, the AP 502 may determine the first frequency resources based at least partly on the plurality of CQIs.

In some embodiments, the AP 502 may encode the TF to indicate a target received signal strength indicator (RSSI) for an uplink NDP transmission from the STA 504. In some embodiments, the AP 502 may determine, based on the uplink NDP, a measured RSSI. In some embodiments, the AP 502 may adjust the target RSSI based on a difference between the target RSSI and the measured RSSI.

In some embodiments, the AP 502 may be configurable to operate as a master AP 502 of a multi-AP group 515. In some embodiments, the master AP 502 may establish the multi-AP group 515, although the scope of embodiments is not limited in this respect. The multi-AP group 515 may include the master AP 502 and one or more other APs 502. The one or more other APs 502 may include one or more satellite APs 502, slave APs 502, and/or other types of APs 502. It should be noted that references are made in some of the descriptions herein to satellite APs 502, but such references are not limiting. For instance, a technique, operation, and/or method performed by a satellite AP 502 in some descriptions herein may be performed by another AP 502 (such as a slave AP 502 and/or other AP 502), in some embodiments.

In some embodiments, the master AP 502 may establish the multi-AP group 515 to enable usage of AP Trigger Frames (AP TFs) for coordination of resources to be used for downlink transmissions of the APs 502 of the multi-AP group 515. In some embodiments, the master AP 502 may establish the multi-AP group 515 to reduce interference between the downlink transmissions of the APs 502 of the multi-AP group 515. Embodiments are not limited to the purposes described above, as the master AP 502 may establish the multi-AP group 515 for any suitable purpose, in some embodiments.

In some embodiments, the master AP 502 may transmit one or more elements during a transmission opportunity (TXOP) obtained by the master AP 502. In some embodiments, one or more operations (such as transmission of the NDPA, NDP, feedback and/or other) may be performed during the TXOP, although the scope of embodiments is not limited in this respect.

It should be noted that some embodiments may not necessarily include all operations shown in FIG. 8. In a non-limiting example, an AP 502 may perform one or more of operations 805-840, but may not necessarily perform one or more of operations 845-860. In another non-limiting example, an AP 502 may perform one or more of operations 845-860, but may not necessarily perform one or more of operations 805-840.

In addition, descriptions herein may refer to performance of operations by a master AP 502 that is part of a multi-AP group 515 that includes one or more satellite APs 502, slave APs 502 and/or other type of APs 502. It is understood, however, that the scope of embodiments is not limited to this arrangement.

In some embodiments, an apparatus of an AP 502 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

At operation 905, the STA 504 may receive a JP poll that requests link budget information. At operation 910, the STA 504 may transmit the link budget information. At operation 915, the STA 504 may receive an NDPA that indicates transmission of an NDP. At operation 920, the STA 504 may receive the NDP. At operation 925, the STA 504 may determine beamforming feedback based on reception of the NDP. At operation 930, the STA 504 may transmit the beamforming feedback. At operation 935, the STA 504 may receive downlink data.

In some embodiments, the STA 504 may from a master AP 502 of a multi-AP group 515 configurable to include the master AP 502 and one or more satellite APs 502, a null data packet (NDP) announcement (NDPA) that indicates a joint transmission of an NDP by a set of APs 502 in accordance with spatial streams (SSs) allocated to each of the APs 502. In some embodiments, the set of APs 502 may include the master AP 502 and one or more of the satellite APs 502 of the multi-AP group 515. In some embodiments, the NDPA may indicate a feedback type of beam-forming feedback to be sent by the STA 504. In some embodiments, the STA 504 may determine the beam-forming feedback based on reception of the NDP in accordance with the allocated SSs. In some embodiments, the STA 504 may transmit the beam-forming feedback. In some embodiments, the feedback type may be included in a set of candidate feedback types that includes one or more of: single user (SU) beam-forming feedback, multi-user (MU) beam-forming feedback, SU nulling feedback, MU nulling feedback, and/or other.

In some embodiments, an apparatus of a STA 504 may comprise memory. The memory may be configurable to store one or more elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to one or more operations of the method 900. The apparatus may include a transceiver to transmit and/or receive one or more blocks, messages and/or other elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the AP configurable to operate as a master AP of a multi-AP group, the multi-AP group comprising the master AP and one or more satellite APs, the apparatus comprising: memory; and processing circuitry, wherein the processing circuitry is configured to, when the AP operates as the master AP:
select, from the multi-AP group, a set of APs that is to communicate with a station (STA) in accordance with joint processing, wherein the set of APs includes the master AP and one or more of the satellite APs of the multi-AP group;
allocate one or more spatial streams to each of the APs of the set of APs for a joint transmission of a null data packet (NDP) to the STA for channel sounding;
encode, for transmission, an NDP announcement (NDPA) that indicates that the APs of the set of APs are to perform the joint transmission of the NDP;
encode the NDP for a joint transmission, the NDP being jointly transmitted by the master AP and at least one other AP of the set, the NDP being jointly transmitted by the master AP in the one or more spatial streams allocated to the master AP and by the at least one other AP in one or more other spatial streams allocated by the master AP to the at least one other AP; and
decode beam-forming feedback from the STA related to reception of the jointly transmitted NDP,
wherein when the AP operates as the master AP, the processing circuitry is configured to determine, based on the beam-forming feedback, whether the APs of the set of APs are to perform joint beamforming for a data transmission to the STA or joint nulling toward the STA,
wherein:
the joint beam-forming includes simultaneous transmission of data to the STA, by the APs of the set of APs, on different spatial streams, and
the joint nulling includes, for each of the APs of the set of APs:
determination of beam-forming coefficients for which a corresponding transmission by the AP results in a null in terms of directional transmission energy toward the STA; and
transmission in accordance with the determined beam-forming coefficients.

2. An apparatus of an access point (AP), the AP configurable to operate as a master AP of a multi-AP group, the multi-AP group comprising the master AP and one or more satellite APs, the apparatus comprising: memory; and processing circuitry, wherein the processing circuitry is configured to, when the AP operates as the master AP:
select, from the multi-AP group, a set of APs that is to communicate with a station (STA) in accordance with joint processing, wherein the set of APs includes the master AP and one or more of the satellite APs of the multi-AP group;
allocate one or more spatial streams to each of the APs of the set of APs for a joint transmission of a null data packet (NDP) to the STA for channel sounding;
encode, for transmission, an NDP announcement (NDPA) that indicates that the APs of the set of APs are to perform the joint transmission of the NDP;
encode the NDP for transmission in the one or more spatial streams allocated to the master AP; and
decode beam-forming feedback related to reception of the NDP at the STA,
wherein when the AP operates as the master AP: before selection of the set of APs, the processing circuitry is further configured to:
encode, for transmission, a joint processing (JP) poll to request link budget information between the STA and one or more of the APs of the multi-AP group;
decode the link budget information; and
select the set of APs based at least partly on the link budget information.

3. The apparatus according to claim 2, wherein:

the link budget information is received from:

the STA, or one or more of the satellite APs operating as relays for the STA.

4. An apparatus of an access point (AP), the AP configurable to operate as a master AP of a multi-AP group, the multi-AP group comprising the master AP and one or more satellite APs, the apparatus comprising: memory; and processing circuitry, wherein the processing circuitry is configured to, when the AP operates as the master AP:

select, from the multi-AP group, a set of APs that is to communicate with a station (STA) in accordance with joint processing, wherein the set of APs includes the master AP and one or more of the satellite APs of the multi-AP group;

allocate one or more spatial streams to each of the APs of the set of APs for a joint transmission of a null data packet (NDP) to the STA for channel sounding;

encode, for transmission, an NDP announcement (NDPA) that indicates that the APs of the set of APs are to perform the joint transmission of the NDP;

encode the NDP for transmission in the one or more spatial streams allocated to the master AP; and decode beam-forming feedback related to reception of the NDP at the STA, wherein when the AP operates as the master AP, the processing circuitry is further configured to:

encode the NDPA to indicate a mapping between the APs of the set of APs and the allocated spatial streams, or encode, for broadcast transmission, a beacon frame that indicates the mapping between the APs of the set of APs and the allocated spatial streams.

\* \* \* \* \*